United States Patent
Shinohara et al.

(10) Patent No.: US 10,025,292 B2
(45) Date of Patent: Jul. 17, 2018

(54) OFFSET NUMBER SETTING DEVICE FOR SETTING AN OFFSET NUMBER FOR A TOOL ATTACHED TO A TURRET SURFACE

(71) Applicants: Citizen Machinery Co., Ltd., Nagano (JP); Citizen Watch Co., Ltd., Nishitokyo-shi, Tokyo (JP)

(72) Inventors: Takanori Shinohara, Nagano (JP); Shinji Fujita, Nagano (JP)

(73) Assignee: Citizen Watch Co., Ltd., Tokyo (JP)

( * ) Notice: Subject to any disclaimer, the term of this patent is extended or adjusted under 35 U.S.C. 154(b) by 310 days.

(21) Appl. No.: 14/783,285

(22) PCT Filed: Apr. 8, 2014

(86) PCT No.: PCT/JP2014/060212
§ 371 (c)(1),
(2) Date: Oct. 8, 2015

(87) PCT Pub. No.: WO2014/168152
PCT Pub. Date: Oct. 16, 2014

(65) Prior Publication Data
US 2016/0048121 A1    Feb. 18, 2016

(30) Foreign Application Priority Data
Apr. 11, 2013 (JP) ................... 2013-082623

(51) Int. Cl.
*G06F 19/00* (2018.01)
*G05B 19/409* (2006.01)
(Continued)

(52) U.S. Cl.
CPC ......... *G05B 19/409* (2013.01); *G05B 19/404* (2013.01); *G05B 19/40938* (2013.01);
(Continued)

(58) Field of Classification Search
CPC .............................................. G05B 19/40938
(Continued)

(56) References Cited

U.S. PATENT DOCUMENTS 4,428,055 A * 1/1984 Zurbrick ............ G05B 19/4015
318/572
4,608,644 A * 8/1986 Kiya .................. G05B 19/4065
483/4
(Continued)

FOREIGN PATENT DOCUMENTS

CN        1675024 A     9/2005
CN     201030590 Y     3/2008
(Continued)

OTHER PUBLICATIONS

Hiroshi et al, Input Program for Wear Compensation of Tool, Input Device and CNC Machine Tool With Input Device, English translation of JP 2003-058216, Feb. 28, 2003, pp. 9.*
(Continued)

*Primary Examiner* — Suresh Suryawanshi
(74) *Attorney, Agent, or Firm* — Harness, Dickey & Pierce, P.L.C.

(57) ABSTRACT

An offset number setting device that freely and easily sets an offset number for a tool to be mounted on a tool holder of a turret surface. A display linkage unit displays a turret surface selection screen on a display, displays a tool holder selection screen on the display by selecting the turret surface, and displays an offset number setting screen on the display by selecting the tool holder. An offset number is therefore set for the tool along with the selection of the turret surface on which the tool is mounted.

3 Claims, 10 Drawing Sheets

(51) Int. Cl.
*G06F 3/0484* (2013.01)
*G05B 19/404* (2006.01)
*G05B 19/4093* (2006.01)
*B23Q 3/155* (2006.01)

(52) U.S. Cl.
CPC .. *G06F 3/0484* (2013.01); *B23Q 2003/15586* (2013.01); *G05B 2219/32128* (2013.01); *G05B 2219/50236* (2013.01); *G05B 2219/50253* (2013.01); *G05B 2219/50291* (2013.01); *G05B 2219/50311* (2013.01); *G05B 2219/50312* (2013.01); *Y02P 90/265* (2015.11)

(58) Field of Classification Search
USPC .......................................................... 700/179
See application file for complete search history.

(56) References Cited

U.S. PATENT DOCUMENTS

| | | | | |
|---|---|---|---|---|
| 5,313,402 | A | * 5/1994 | Ito | G05B 19/182 |
| | | | | 700/179 |
| 5,798,928 | A | 8/1998 | Niwa | |
| 6,804,575 | B2 | * 10/2004 | Sagawa | G05B 19/4093 |
| | | | | 483/11 |
| 2005/0262976 | A1 | 12/2005 | Shibui | |
| 2015/0323923 | A1 | * 11/2015 | Takabe | B23C 3/28 |
| | | | | 700/186 |
| 2016/0187871 | A1 | * 6/2016 | Yi | B23Q 1/0045 |
| | | | | 700/173 |

FOREIGN PATENT DOCUMENTS

| | | | |
|---|---|---|---|
| EP | 0165999 | A1 | 1/1986 |
| JP | 04184504 | A * | 7/1992 |
| JP | 10-58279 | | 3/1998 |
| JP | 10058279 | A * | 3/1998 |
| JP | 2000-158290 | A | 6/2000 |
| JP | 2002-014710 | A | 1/2002 |
| JP | 2003058216 | A | 2/2003 |
| JP | 2003-285245 | A | 10/2003 |
| JP | 2005135104 | A | 5/2005 |
| JP | 2009-288998 | A | 12/2009 |
| JP | 2011-76570 | | 4/2011 |
| KR | 2001-0066571 | A | 7/2001 |

OTHER PUBLICATIONS

International Search Report PCT/ISA/210 for International Application No. PCT/JP2014/060212 dated Jul. 15, 2014.
Korean Office Action dated Jul. 31, 2017 issued in corresponding Korean Application No. 10-2015-7032211 (with English translation).
Rong, G. A. O. "Design on Selector of Tools in CNC Lathe Simulation System." *Machine Tool & Hydraulics 2* (2005): 57-59 (partial translation).
Shan Dongwei, et al. "Tool compensation applications in CNC lathe machining." *Mechanical Engineer 1* (2011): 145-146 (partial translation).
Chinese Office Action dated Dec. 26, 2016 issued in corresponding Chinese Application No. 201480020546.1 (partial translation).
Extended European Search report dated Apr. 28, 2017 issued in corresponding European Application No. 14782943.6.

* cited by examiner

OFFSET NUMBER SETTING DEVICE FOR SETTING AN OFFSET NUMBER FOR A TOOL ATTACHED TO A TURRET SURFACE

CROSS-REFERENCE TO RELATED APPLICATIONS

This is a National Phase of PCT Patent Application No. PCT/JP2014/060212, filed on Apr. 8, 2014, which claims priority under 35 U.S.C. § 119, which claims priority from Japanese Patent Application No. 2013-82623, filed on Apr. 11, 2013, the contents of each of which are hereby incorporated by reference in their entirety.

TECHNICAL FIELD

The present invention relates to an offset number setting device.

BACKGROUND ART

A turret tool selection and command method has been known (refer to Patent Literature 1, for example). When a predetermined tool is mounted on a tool holder mounted on a predetermined turret surface of a turret, the tool is selected with this turret tool selection and command method based on a tool number (corresponding to offset number in this application) set for the tool and a turret surface number of a turret surface on which the tool is mounted.

CITATION LIST

Patent Literature

Patent Literature 1: Japanese Patent No. 3207125 (Page 3 and FIG. 5)

SUMMARY

Technical Problem

However, various tools are mounted on the turret surfaces through various tool holders in accordance with a processing. For this reason, an offset number setting device that can easily and freely set an offset number for a tool to be attached to a turret surface through a tool holder is desired so as to select a tool required for a processing with the turret tool selection and command method.

Solution to Problem

According to a first aspect of example embodiments of the present invention, an offset number setting device includes a display that displays a turret surface selection screen for selecting a turret surface formed in a turret, a tool holder selection screen for selecting a tool holder mountable to the selected turret surface, and an offset number setting screen for setting an offset number for a tool to be mounted on the selected tool holder, and a data processor that processes information input by each of the screens, wherein the data processor includes a display linkage unit that displays the tool holder selection screen by selecting the turret surface and displays the offset number setting screen by selecting the tool holder, and an offset number is set for the tool to be mounted on the tool holder along with the selection of the turret surface and the tool holder.

According to a second aspect of example embodiments of the present invention, the data processor includes an offset number selection screen display unit that displays an offset number selection screen for displaying the offset number on the display to select an unset offset number when setting the offset number by the offset number setting screen.

According to a third aspect of example embodiments of the present invention, the data processor includes a memory in which the offset number set by the offset number setting screen is stored along with the selection of the turret surface and the tool holder.

Advantageous Effects

According to the above configuration of the present invention, the turret surface is selected by the turret surface selection screen displayed on the display, the tool holder mountable to the selected turret surface is selected by the tool holder selection screen displayed by selecting the turret surface, and the offset number is set for the predetermined tool by the offset number setting screen displayed by selecting the tool holder. An operator can thereby freely and easily set the offset number for the tool along with the selection of the turret surface on which the tool is mounted.

An operator can thereby freely set the offset number for the tool to be used for a processing without increasing an usable offset number. Also, the operator can easily select the predetermined tool by a tool selection number based on the offset number set for the tool and the turret surface number of the turret surface on which the tool is mounted.

According to the above configuration of the present invention, the offset number selection screen display unit that displays the offset number selection screen for displaying the offset number on the display is provided to select an unset offset number when setting the offset number by the offset number setting screen. With this configuration, the unset offset number can be easily input by the offset number selection screen displayed on the display.

According to the above configuration of the present invention, the memory that stores the offset number set by the offset number setting screen along with the selection of the turret surface and the tool holder. With this configuration, the offset number of the tool set along with the selection of the turret surface and the tool holder can be easily referred with each processor, and the position of the selected tool can be easily corrected based on the offset value corresponding to the set offset number.

DESCRIPTION OF EMBODIMENT

Figure 1:
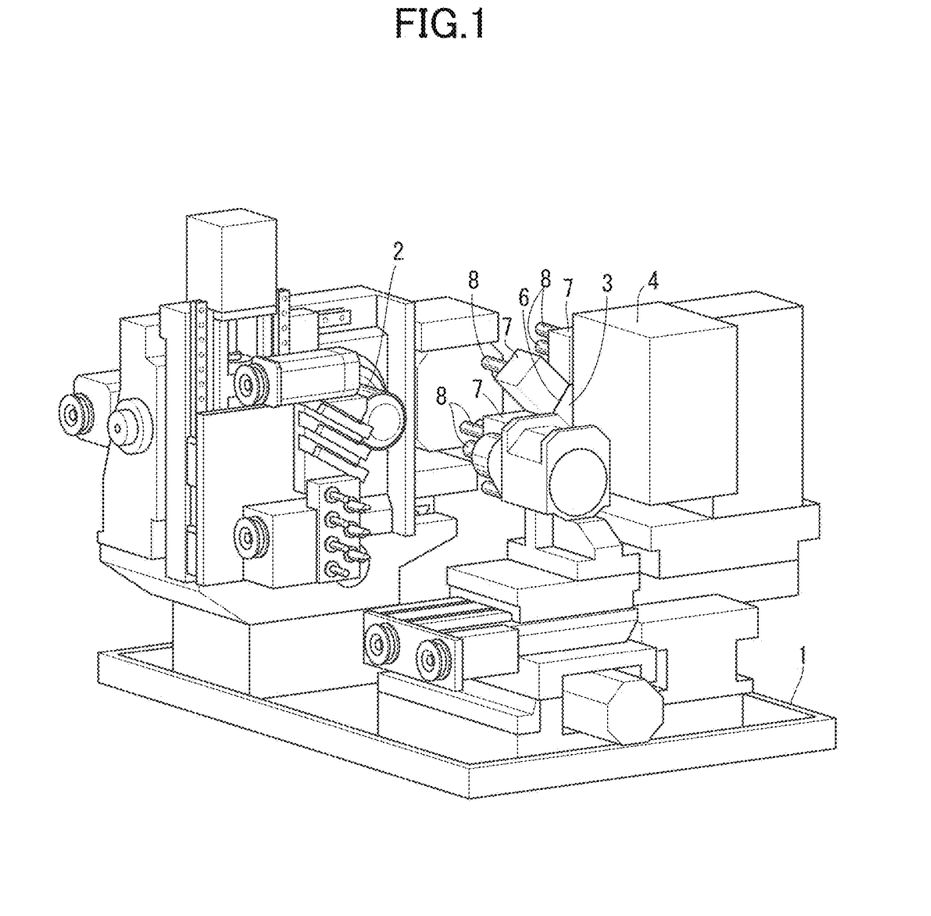
FIG. 1 is a schematic perspective view illustrating an automatic lathe.

FIG. 1 is a schematic perspective view illustrating an automatic lathe as a machining tool including an offset number setting device according to the present invention.

A main spindle 2 and a turret 3 are provided on a bed 1 of an automatic lathe. The main spindle 2 is supported to be rotatable about an axis line. The turret 3 is supported by a tool post main body 4 to be rotatable. The tool post main body 4 is provided to be movable in a Z-axis direction as an axis line direction of the main spindle 2, an X-axis direction and a Y-axis direction orthogonal to the Z-axis direction.

The turret 3 moves in the Z-axis direction, X-axis direction, and Y-axis direction along with the movement of the tool post main body 4. A plurality of turret surfaces 6 is formed in an outer circumference surface of the turret 3. Various types of tool holders 7 are detachably attached to the respective turret surfaces 6. A processing tool 8 is attached to each tool holder 7. The tool 8 is attached to the tool holder 7 through a mounting portion formed in the tool holder 7.

Figure 2:
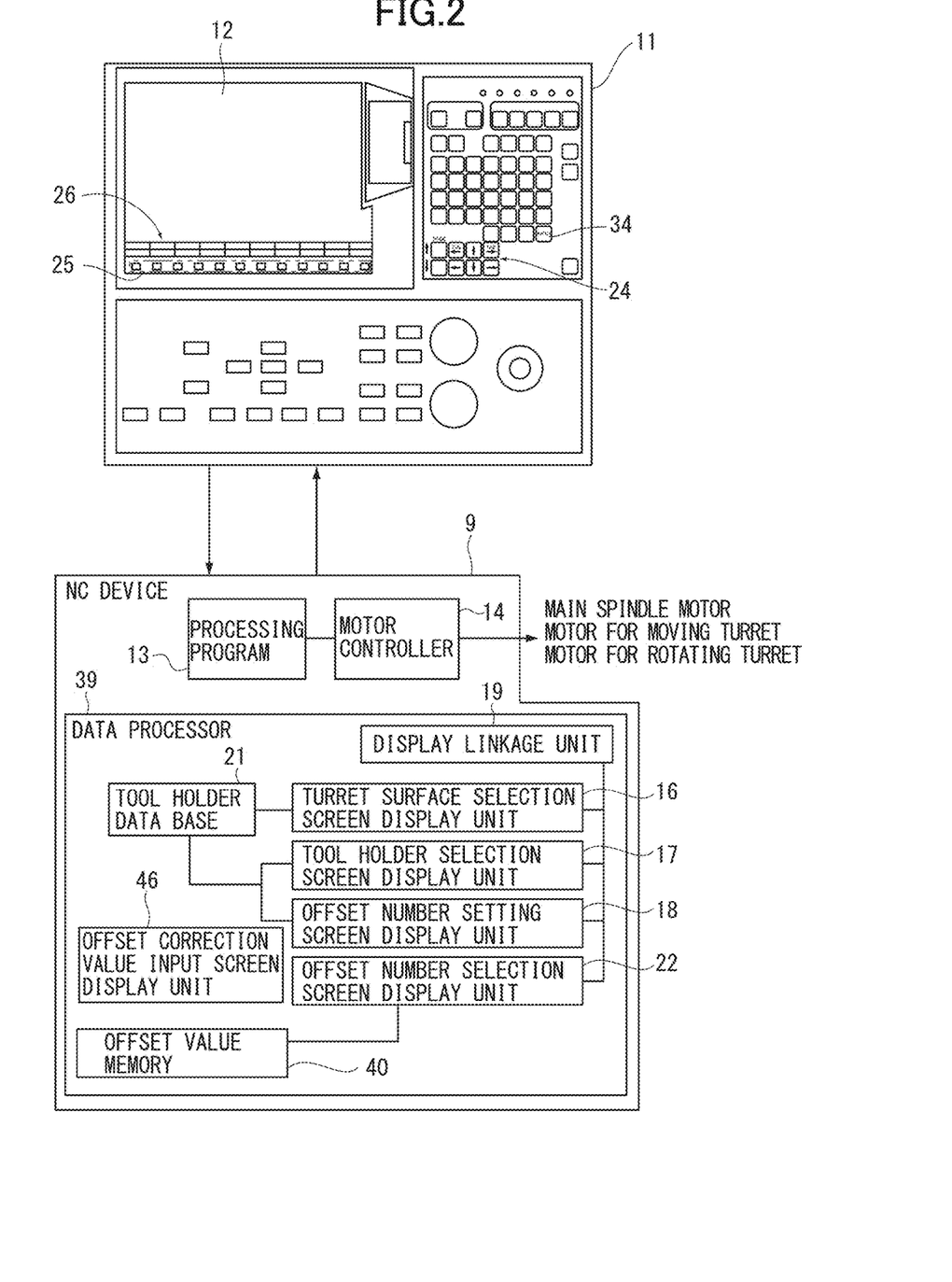
FIG. 2 is a block diagram illustrating a controller.

The rotation of the main spindle 2 and the turret 3 and the movement of the turret 3 (tool post main body 4) are controlled by a controller 9 that is an NC device shown in FIG. 2. The controller 9 is provided with an operation panel 11 for operating the controller 9. The operation panel 11 includes a monitor 12 as various switches and a display and a menu switch 25 corresponding to a menu bar 26 displayed on the monitor 12. The operation panel 11 is connected to the controller 9.

A processing program 13 is previously input into the controller 9. The controller 9 includes a motor controller 14 that controls a main spindle motor for rotating the main spindle 2, a turret rotation motor for rotating the turret 3, and a turret movement motor for moving the turret 3.

The automatic lathe automatically performs a predetermined processing to a material held by the main spindle 2 with the tool 8 attached to the turret 3 by controlling each motor through the motor controller 14 based on the processing program 13. The tool 8 required for the processing is selected by the rotation and the movement of the turret 3.

Figure 3:
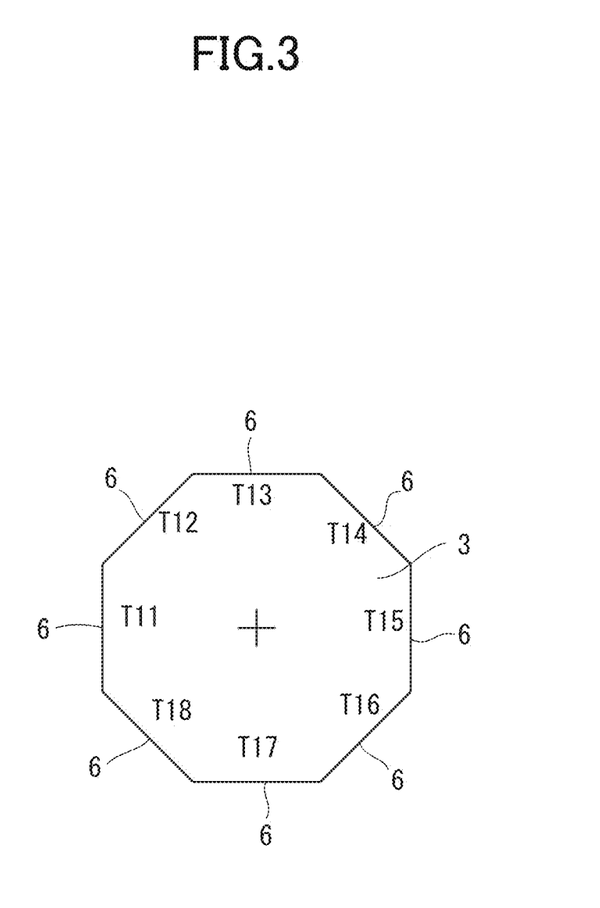
FIG. 3 is a schematic view of a turret showing a relationship between a turret surface and a turret surface number.

As illustrated in FIG. 3, turret surface numbers T11 to T18 are previously allocated to the turret surfaces 6, respectively. The respective turret surface numbers are set to avoid the duplication of the numbers. An offset number is previously set for each tool 8 that is attached to each tool holder 7 mounted on each turret surface 6 with the offset number setting device The offset number corresponds to an offset value (correction value) that corrects the position of the tool 8 having the offset number with respect to a coordinate position assumed with the processing program 13. The offset number is stored in an offset value memory 40 provided in the controller 9. The controller 9 is configured to select the predetermined tool 8 based on a tool selection number that is a sequence of the turret surface number on which the tool 8 is mounted and the offset number of the tool 8.

The tool mounted on the turret surface number T13 and having the offset number 22 is selected by describing the tool selection number of T1322 in the processing program 13. In this case, the controller 9 rotates the turret 3 to determine the tool 8 selected by determining the turret surface 6 having the turret surface number T13 in a predetermined angle position, and sets coordinates of the X-axis, Y-axis, and Z-axis based on the offset value previously set for the offset number 22 with reference to the offset value memory 40. The turret 3 thereby moves by the movement command of X-axis, Y-axis, and Z-axis to correct the position of the selected tool 8. The material can be thus processed.

The controller 9 rotates the turret 3 with every reading of the tool selection number. However, when the same turret number is selected, the relative rotation angle is 0 and the turret 3 rotates at 0 degree. In this case, the turret 3 may not rotate.

The offset number setting device is configured by the controller 9. The controller 9 includes a data processor 39. The data processor 39 includes a turret surface selection screen display unit 16 that displays a turret surface selection screen 20 for selecting the turret surface 6 on the monitor 12, a tool holder selection screen display unit 17 that displays a tool holder selection screen 29 for selecting the tool holder 7 on the monitor 12, and an offset number setting screen display unit 18 that displays an offset number setting screen 30 for setting an offset number on the monitor 12.

The turret surface selection screen display unit 16, the tool holder selection screen display unit 17, and the offset number setting screen display unit 18 are linked by a display linkage unit 19 provided in the data processor 39. The data processor 39 also includes a tool holder data base 21 that stores names, sizes, shapes, and the like of the tool holder 7 mountable on each turret surface 6, an offset number selection screen display unit 22 that displays an offset number selection screen 42 for displaying the offset number on the monitor 12 when setting the offset number on the offset number setting screen, and the offset value memory 40.

Figure 4:
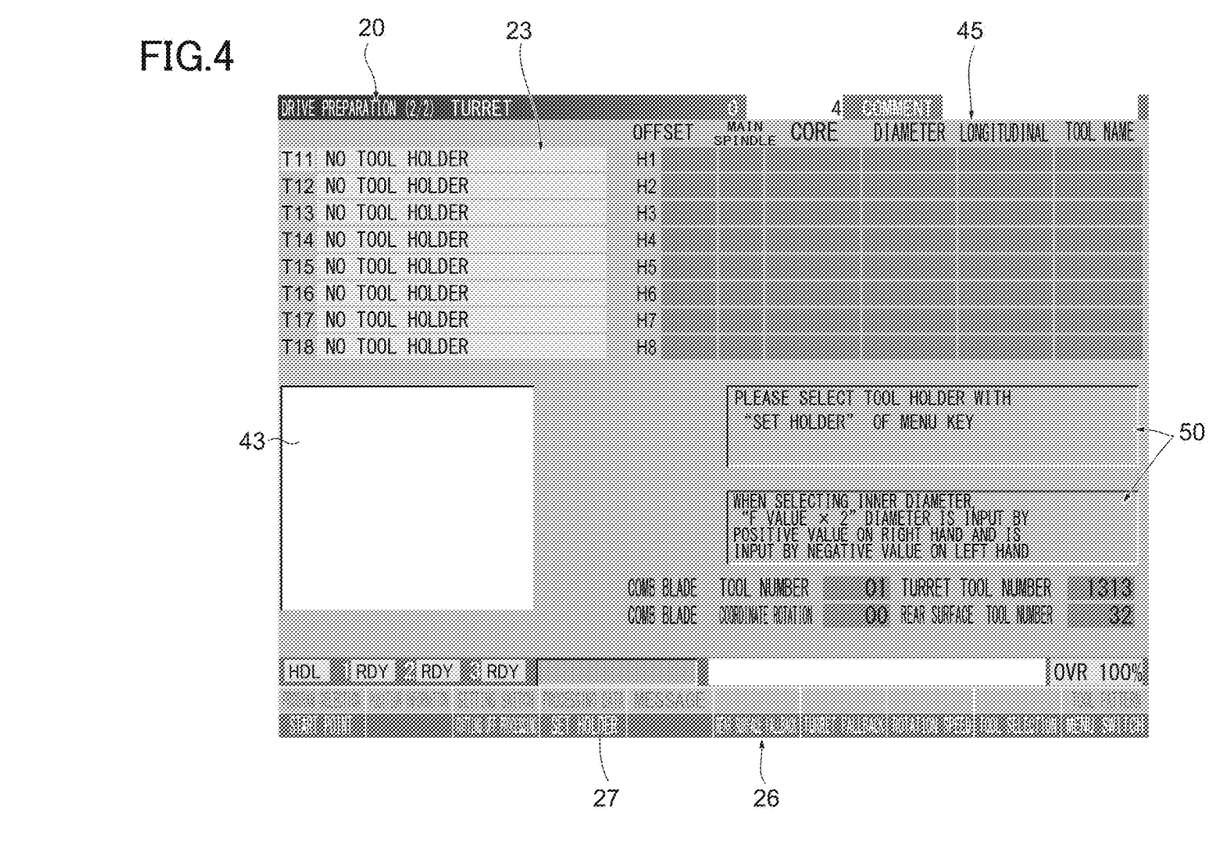
FIG. 4 is a view showing a turret surface selection screen.

As illustrated in FIG. 4, the turret surface selection screen 20 includes a turret surface list 23 that shows the respective turret surfaces 6 of the turret 3 with the turret surface numbers. A predetermined turret surface number shown in the turret surface list 23 can be displayed in color with a cursor key 24 provided in the operation panel 11. The turret surface number on which the predetermined tool 8 is mounted is displayed in color, and the menu key corresponding to "SET HOLDER" 27 of the menu bar 26 displayed on the monitor 12 is pressed (ON). The turret surface 6 corresponding to the turret surface number displayed in color can be thereby selected. Note that operation guidance and the like are displayed on a guidance display part 50.

Figure 5:
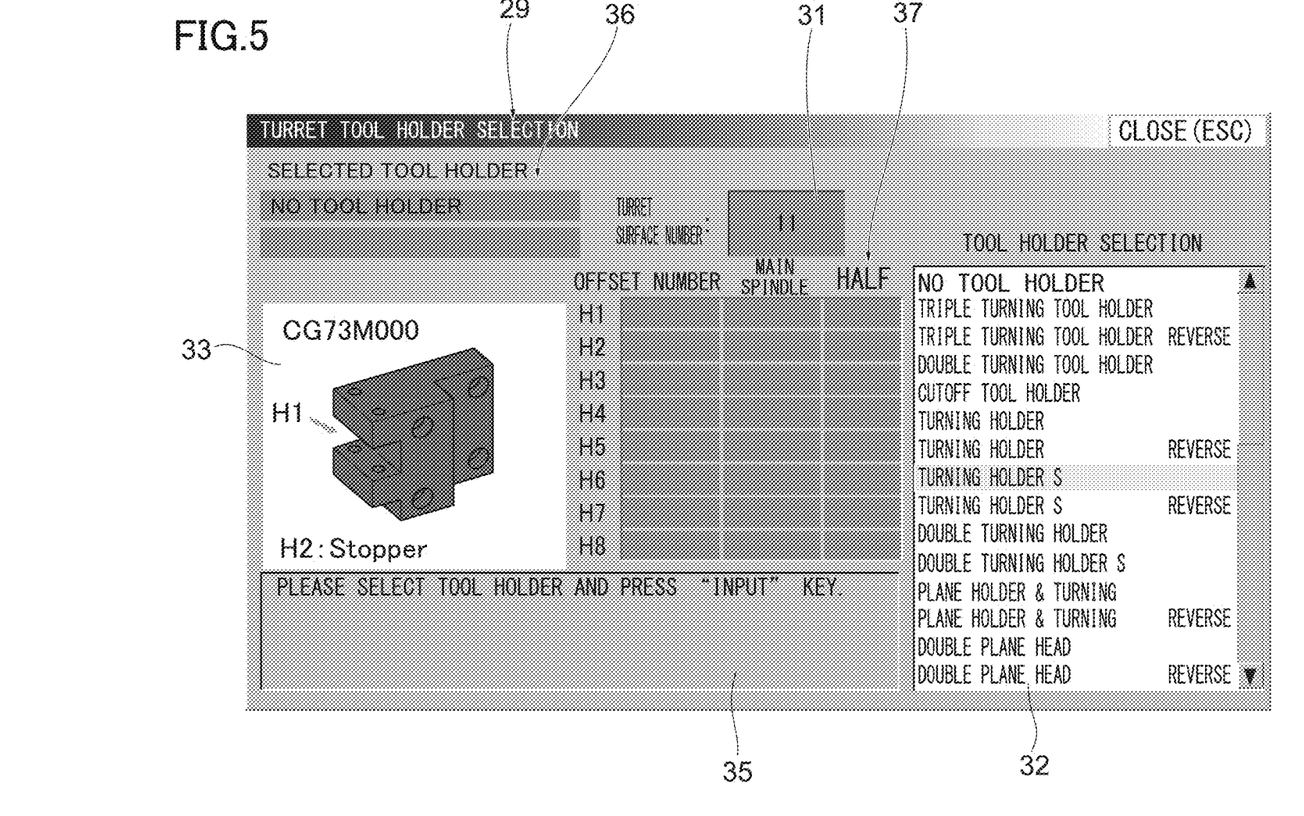
FIG. 5 is a view showing a tool holder selection screen.

The tool holder 7 to be mounted on the turret surface 6 selected by the turret surface selection screen 20 can be selected by the tool holder selection screen 29 as illustrated in FIG. 5. The tool holder selection screen 29 of the present embodiment is superimposed on the turret surface selection screen 20 with a multi-window.

The tool holder selection screen 29 includes a turret surface number display part 31 that displays the selected turret surface 6 with the turret surface number and a tool holder list display part 32 that displays the respective tool holders 7 mountable to the selected turret surface 6. The tool holder list display part 32 displays the names of the tool holders 7 based on the tool holder data base 21.

The predetermined tool holder 7 displayed on the tool holder list display part 32 can be displayed in color with the cursor key 24. The tool holder 7 displayed in color is graphically displayed on a holder display area 33 based on the information of the tool holder data base 21.

Figure 6:
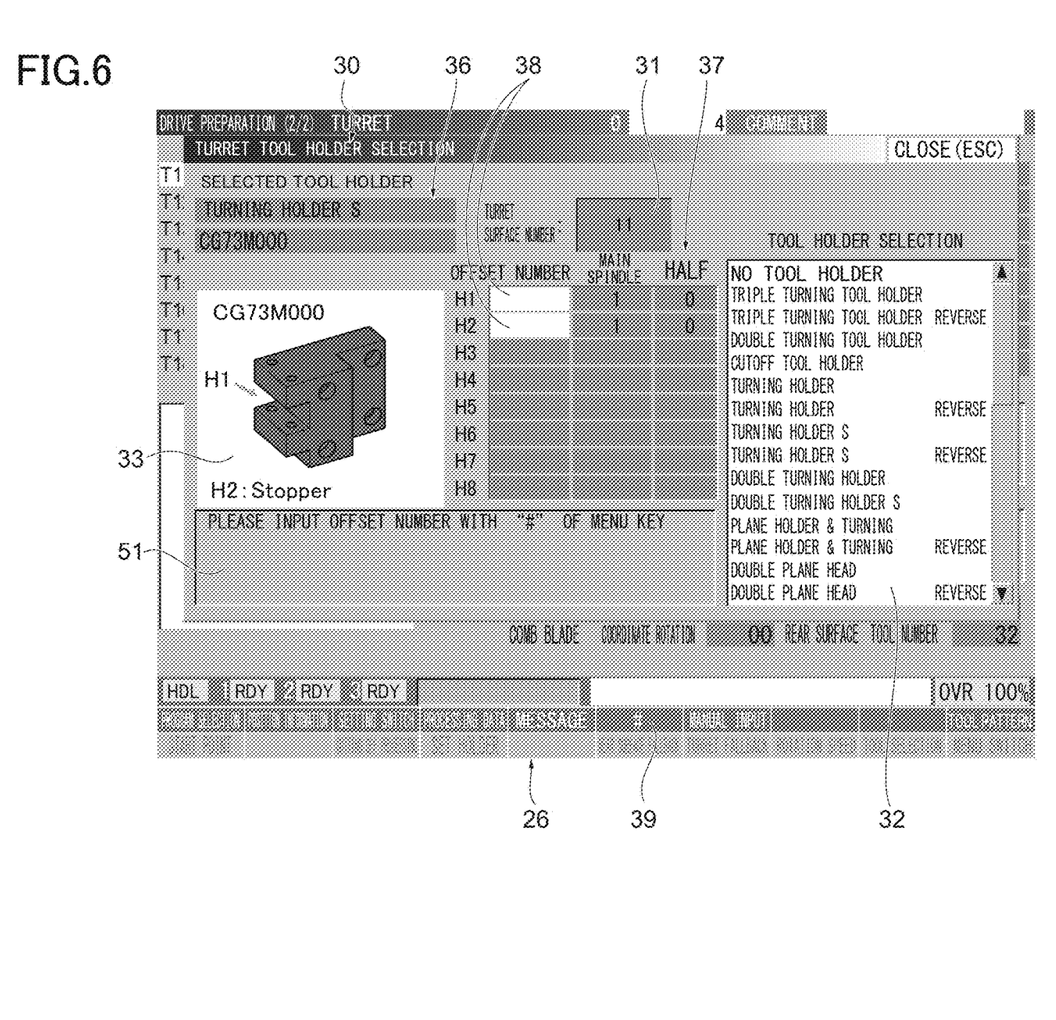
FIG. 6 is a view showing an offset number setting screen.

The tool holder 7 to be mounted on the selected turret surface 6 is displayed in color and an input key 34 provided in the operation panel 11 is pressed (ON). The tool holder 7 displayed in color can be thereby selected. Note that operation guidance and the like are displayed on a guidance display part 35. The name and the type of the selected tool holder 7 are displayed on a selected tool holder display part 36 based on the tool holder data base 21 by selecting the predetermined tool holder 7 as illustrated in FIG. 6. A tool holder number can be applied to the tool holder 7. As the tool holder number, a number in which the name and the type of the tool holder 7 are digitalized or a type such as CG73M000 can be used.

When the predetermined tool holder 7 is selected, the offset number input part 37 is switched to the offset number input part 37 into which the offset number can be input in accordance with the mounting part of the selected tool holder 7, as illustrated in FIG. 6. The tool holder selection screen 29 configures the offset number setting screen 30. The offset number of the tool 8 to be mounted on the mounting portion of the tool holder 7 selected by the tool holder selection screen 29 can be set by the offset number setting screen 30.

The offset number input part 37 includes an input part 38 into which the offset number can be input in accordance with each mounting portion of the selected tool holder 7. The input part 38 corresponding to the predetermined mounting portion can be displayed in color on the offset number setting screen 30 with the cursor key 24. The tool holder numbers such as H1 and H2 can be applied to the mounting portions, as illustrated in FIG. 6. Note that the operation guidance and the like are displayed on a guidance display part 51.

Figure 7:
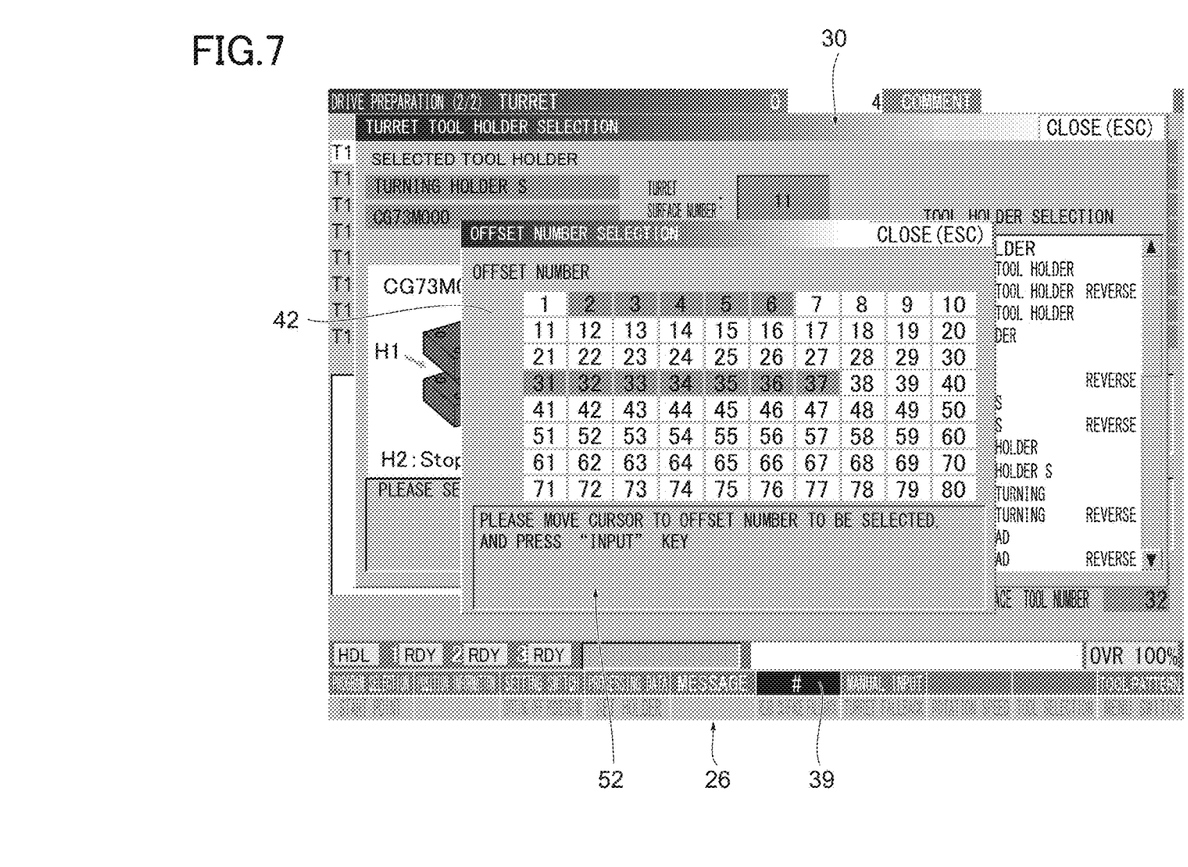
FIG. 7 is a view showing an offset number selection screen.

While the input part 38 corresponding to the mounting portion on which the tool 8 having the offset number is mounted is displayed in color, when the menu key corresponding to "#" 39 of the menu bar 26 is pressed (ON), the display of the offset number is requested, and the offset number selection screen 42 illustrated in FIG. 7 can be displayed. The offset number selection screen 42 displays the offset numbers that are set for the tool 8 to be distinguished between set offset numbers and unset offset numbers based on the offset value memory 40.

In this embodiment, the set offset numbers are grayed out to be displayed. The offset number selection screen 42 of the present embodiment is superimposed on the offset number setting screen 30 with a multi-window. The offset number selection screen 42 can display the offset numbers displayed on the offset number selection screen 42 in color with the cursor key 24.

While the predetermined input part 38 is displayed in color, when the offset number to be set is displayed in color, the offset number can be input into the input part 38 similar to the input (writing) of the offset number into the input part 38. However, the grayed-out offset number cannot be displayed in color and cannot be input into the input part 38.

With this state, when the input key 34 is pressed to request the setting of the offset number, the offset number displayed in color is set for the tool 8 to be mounted on the mounting portion corresponding to the input part 38. Note that the operation guidance and the like are displayed on a guidance display part 52.

The data processor 39 links the set offset number with the tool holder number and the mounting portion number of the tool holder 7 on which the tool 8 is mounted, and the turret surface number of the turret surface 6 to be stored in the offset value memory 40. The turret surface number, tool holder number, mounting portion number, offset number, and offset value are stored in the offset value memory 40 with respect to each offset number.

Figure 8:
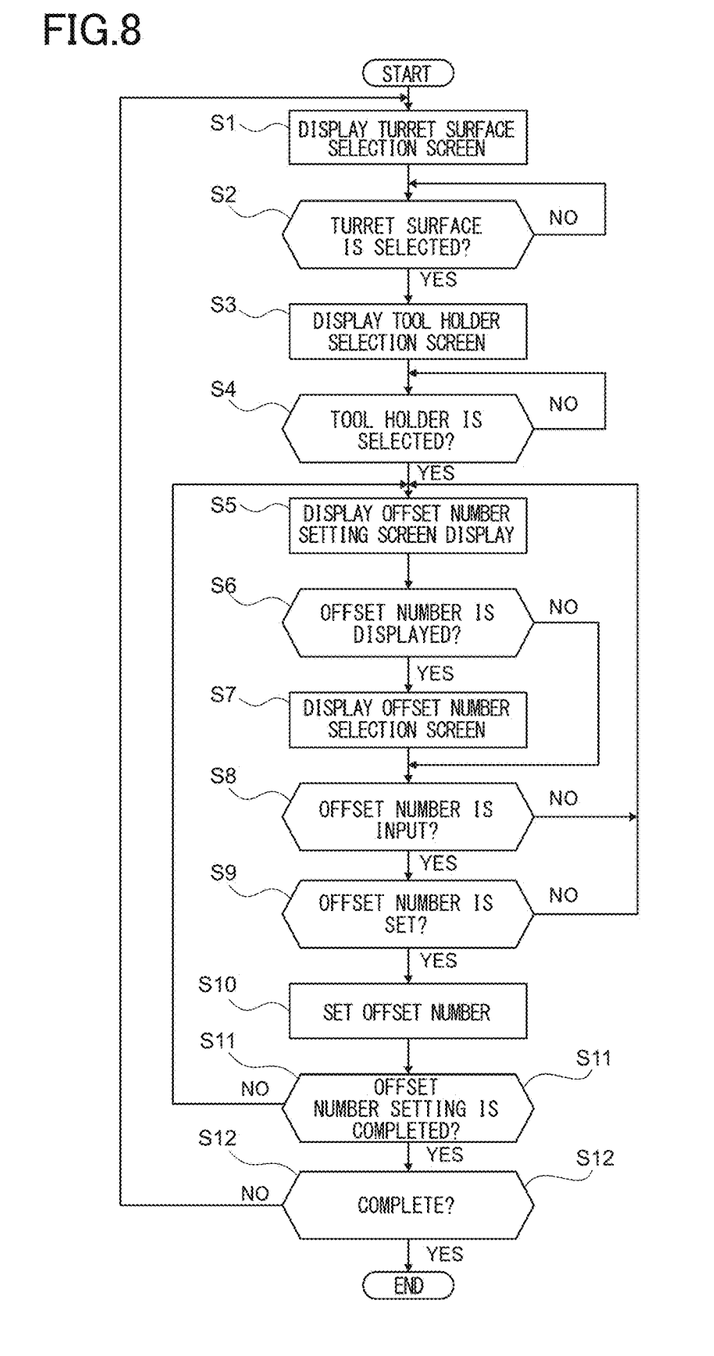
FIG. 8 is a flowchart showing an operation of an offset number setting device.

Upon the start of the setting operation of the offset number by the offset number setting device, the display linkage unit 19 operates the turret surface selection screen display unit 16 to display the turret surface selection screen 20 in Step S1, and then determines whether or not the turret surface 6 is selected in Step S2, as illustrated in the flowchart of FIG. 8. When the turret surface 6 is selected, the display linkage unit 19 operates the tool holder selection screen display unit 17 to display the tool holder selection screen 29 in Step S3, and determines whether or not the tool holder 7 is selected in Step S4.

When the tool holder 7 is selected, the display linkage unit 19 operates the offset number setting screen display unit 18 to display the offset number setting screen 30 based on the tool holder selection screen 29 in Step S5, and determines whether or not the display of the offset number is requested in Step S6. When the display of the offset number is requested in Step S6, the display linkage unit 19 operates the offset number selection screen display unit 22 to display the offset number selection screen 42 in Step S7, and determines whether or not the offset number is input in Step S8.

When the display of the offset number is not requested in Step S6, the flow proceeds to Step S8 from Step S6 without displaying the offset number selection screen 42. When the offset number is input in Step S8, the setting request is confirmed in Step S9. When the setting is requested, the input offset number is set in Step S10.

After the offset number is set in Step S10, it is confirmed that the setting of the offset number for the tool 8 to be attached to the tool holder 7 selected in Step S4 is completed in Step S11. When the setting of the offset number is not completed in Step S11, for example, when the offset number is continuously set, the flow returns to Step S5. When the setting of the offset number is completed in Step S11, the completion is confirmed in Step S12. When the setting of the offset number is completed, the setting operation of the offset number by the offset number setting device is completed.

When the setting of the offset number is not completed in Step S12, for example, when the offset number is set for another turret surface 6, the flow returns to Step S1. The offset number can be set for the tool 8 to be mounted on the turret surface 6 by executing Steps S1 to S11 similar to the above.

An operator can easily and freely set the offset number of the tool 8 along with the selection of the turret surface 6 on which the tool 8 is mounted. With this configuration, even when a plurality of tools 8 is attached to one turret surface 6, the offset number can be freely set for the tool 8 required for processing, and the offset number can be effectively allocated without increasing an usable offset number.

Figure 9:
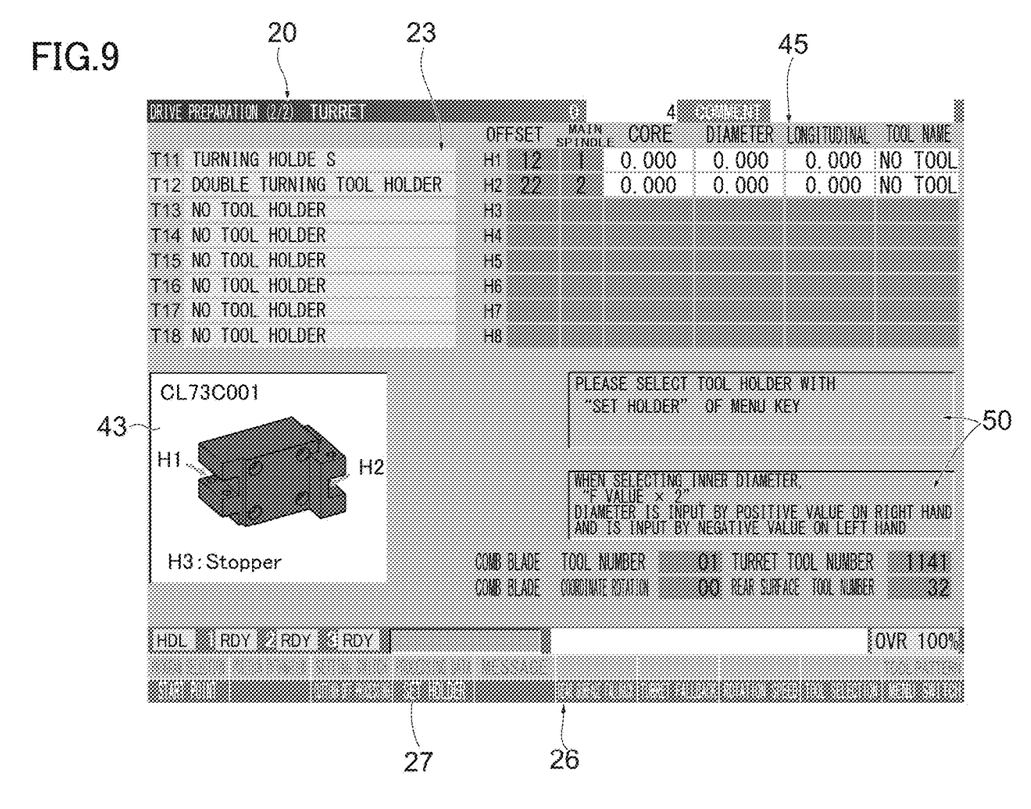
FIG. 9 is a view showing a turret surface selection screen on which the offset number is set.

As illustrated in FIG. 9, the turret surface selection screen 20 is configured, after the offset number is set, to display the name of the tool holder 7 selected to which the turret surface 6 on the turret surface list 23 based on the offset value memory 40 and to graphically display the tool holder 7 to be mounted on the predetermined turret surface 6 on the tool holder display part 43 based on the information of the tool holder data base 21. The tool holder 7 is graphically displayed by displaying the turret surface 6 to which the tool holder 7 is selected in color on the turret surface list 23. The turret surface list 23 displays "NO TOOL HOLDER" relative to the turret surface 6 to which the tool holder 7 is not selected.

The offset values corresponding to the offset number can be input into an offset display part 45 displayed on the turret surface selection screen 20. The offset display part 45 includes areas (core area, diameter area, and longitudinal area) into which the offset values to each offset number corresponding to the turret surface number can be input with respect to each turret surface 6 (turret surface number).

When the tool holder 7 is selected by the turret surface selection screen 20 and a TAB key of the cursor key 24 provided in the operation panel 11 is pressed, a cursor is moved to the areas of the offset display part 45 into which the offset values can be input. Therefore, the Y-axis coordinate of the offset value can be input into the core area, the X-axis coordinate of the offset value can be input into the diameter area, and the Z-axis coordinate of the offset value can be input into the longitudinal area. The input offset values are stored in the offset value memory 40.

The above offset values input relative to the offset numbers are displayed on the offset display part 45. An operator can easily perform the mounting operation of the tool holder 7 to the turret surface 6, and the mounting operation of the tool 8 to the tool holder 7 while checking the graphic display of the tool holder 7 displayed on the tool holder display part 43.

The controller 9 can easily correct the position of the tool 8 by obtaining the offset value from the offset value memory 40 based on the offset number set for the tool 8.

Figure 10:
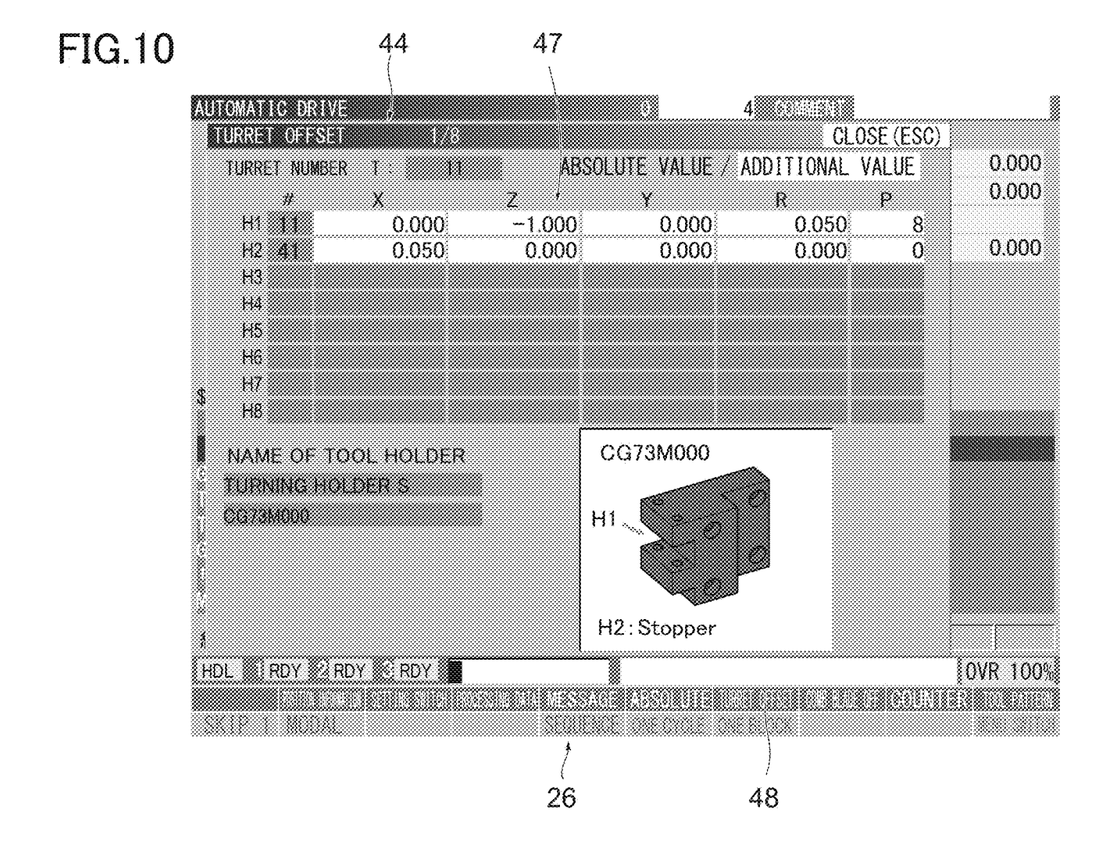
FIG. 10 is a view showing an offset correction value input screen.

The offset number setting device according to the present invention includes an offset correction value input screen display unit 46 that displays on the display 12 an offset correction value input screen 44 into which the correction value to the offset value corresponding to the offset number shown in FIG. 10 can be input. By pressing (ON) the menu key corresponding to "TURRET OFF" 48 of the menu bar 26 on an automatic drive screen of the automatic lathe, the offset correction value input screen 44 is displayed.

The offset correction value input screen 44 includes an offset correction value input part 47 into which the correction value to the offset value relative to each offset number corresponding to the turret surface number can be input. The correction value to the offset value can be easily input relative to each offset number with respect to each turret surface 6 with the offset correction value input part 47. Thus, processing errors and the like due to the wear of the tool 8 can be corrected.

CROSS-REFERENCE TO RELATED APPLICATION

The present application is based on and claims priority from Japanese Patent Application No. 2013-82623, filed on Apr. 11, 2013, the disclosure of which is hereby incorporated by reference in its entirety.

The invention claimed is:
1. An apparatus, comprising:
a machining tool device, the machining tool device including
 a main spindle configured to rotate around an axis line, and
 a turret configured to move in an X-direction, a Y-direction, and a Z-direction, the turret including a plurality of turret surfaces extending around a circumference of the turret, each turret surface configured to attach to a separate tool holder, each tool holder including a mounting portion configured to attach to a separate tool; and
an offset number setting device, the offset number setting device including
 a display configured to display
  a turret surface selection screen to enable operator selection of a particular turret surface of the plurality of turret surfaces,
  a tool holder selection screen to enable operator selection of a particular tool holder to be mounted to the particular turret surface, and
  an offset number setting screen to enable operator setting of a particular offset number associated with a tool to be mounted on the particular tool holder; and
a data processor configured to process information received based on operator interaction with each screen of the turret surface selection screen, the tool holder selection screen, and the offset number setting screen, such that the data processor is configured to
 associate the particular turret surface and a particular mounting portion of the particular tool holder with the particular offset number based on receiving the operator selection of the particular turret surface via the turret surface selection screen, receiving the operator selection of the particular tool holder, and receiving the operator selection of the particular offset number,
 generate a tool selection number that is a representation of the association of the particular turret surface, the particular tool holder, and the particular mounting portion with the particular offset number,
 control one or more motors to move the turret in response to selection of the tool selection number, such that the particular turret surface is positioned in a particular set position, and the turret is moved to correct a position of the particular tool in relation to a set X-axis, Y-axis, and Z-axis in accordance with the particular offset number,
 perform processing of a material held by the main spindle, using the particular tool attached to the particular tool holder and positioned in accordance with the particular offset number, and
 implement a display linkage unit to
  implement a turret surface selection screen display unit to cause the display to display the turret surface selection screen,
  implement a tool holder selection screen display unit to cause the display to display the tool holder selection screen based receiving the operator selection of the particular turret surface via the turret surface selection screen, and
  implement an offset number setting screen display unit to cause the display to display the offset number setting screen based on receiving the operator selection of the particular tool holder.
2. The apparatus according to claim 1, wherein
the data processor is configured to display an offset number selection screen to display the particular offset number on the display to enable operator selection of an unset offset number as the particular offset number when setting the particular offset number by the offset number setting screen.
3. The apparatus according to claim 1, wherein
the data processor includes a memory configured to store the tool selection number.

* * * * *

UNITED STATES PATENT AND TRADEMARK OFFICE
CERTIFICATE OF CORRECTION

PATENT NO. : 10,025,292 B2
APPLICATION NO. : 14/783285
DATED : July 17, 2018
INVENTOR(S) : Takanori Shinohara et al.

Page 1 of 1

It is certified that error appears in the above-identified patent and that said Letters Patent is hereby corrected as shown below:

On the Title Page

(73) ASSIGNEES should read:
CITIZEN WATCH CO., LTD., TOKYO, JAPAN
CITIZEN MACHINERY CO., LTD., NAGANO, JAPAN Signed and Sealed this
Fifth Day of February, 2019

Andrei Iancu
*Director of the United States Patent and Trademark Office*